US006785817B2

(12) United States Patent
Bacon et al.

(10) Patent No.: US 6,785,817 B2
(45) Date of Patent: *Aug. 31, 2004

(54) REPROGRAMMABLE SUBSCRIBER TERMINAL

(75) Inventors: Kinney C. Bacon, Lawrenceville, GA (US); R. Thomas Haman, Duluth, GA (US); David B. Lett, Duluth, GA (US); Robert O. Banker, Cumming, GA (US); Michael P. Harney, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/370,835

(22) Filed: Feb. 21, 2003

(65) Prior Publication Data

US 2003/0140237 A1 Jul. 24, 2003

Related U.S. Application Data

(63) Continuation of application No. 09/748,515, filed on Dec. 22, 2000, now Pat. No. 6,564,324, which is a continuation of application No. 08/480,765, filed on Jun. 7, 1995, now Pat. No. 6,212,278, which is a continuation of application No. 08/220,626, filed on Mar. 28, 1994, now Pat. No. 5,440,632, which is a continuation of application No. 07/983,909, filed on Dec. 2, 1992, now abandoned.

(51) Int. Cl.[7] ............................ G06F 11/30; H04L 9/00; H04N 7/167
(52) U.S. Cl. ..................... 713/189; 713/164; 713/201; 380/202; 380/239
(58) Field of Search ............................ 713/2, 189, 201, 713/164; 380/202, 210, 211, 239

(56) References Cited

U.S. PATENT DOCUMENTS

| 3,789,131 A | 1/1974 | Harney |
| 4,247,106 A | 1/1981 | Jeffers et al. |
| 4,430,669 A | 2/1984 | Cheung |
| 4,475,123 A | 10/1984 | Dumbauld et al. |
| 4,494,142 A | 1/1985 | Mistry |
| 4,706,121 A | 11/1987 | Young |
| 4,742,543 A | 5/1988 | Frederiksen |
| 4,787,085 A | 11/1988 | Suto et al. |
| 4,829,569 A | 5/1989 | Seth-Smith et al. |
| 4,866,770 A | 9/1989 | Seth-Smith et al. |
| 4,908,834 A | 3/1990 | Wiedemer |

(List continued on next page.)

Primary Examiner—Gilberto Barrón
Assistant Examiner—Kambiz Zand

(57) ABSTRACT

A reprogrammable subscriber terminal of a subscription television service which can have the control program code of its control processor modified by downloading new program code from the headend. The control processor stores a boot program in an internal read only memory. Upon start up and resets, the boot program determines whether the control program should be changed from a command sent from the headend. The command, termed a parameters transactions, includes the number of expected download program code transactions required to complete the control code modification, the memory space areas where the code is to be loaded, and the channel over which the download program code transactions are to be transmitted. The channel is tuned and when the boot program receives all the download program code transactions accurately and stores them, the boot program will cause the control program to be restarted at a selected address of the new or modified control program code which has been downloaded. The boot program may download code to different configurations of subscriber terminals including those with Flash EPROM or extended memories from plug-in expansion modules.

36 Claims, 14 Drawing Sheets

U.S. PATENT DOCUMENTS

| | | |
|---|---|---|
| 4,912,760 A | 3/1990 | West, Jr. et al. |
| 4,977,455 A | 12/1990 | Young |
| 5,091,936 A | 2/1992 | Katznelson et al. |
| 5,093,921 A | 3/1992 | Bevins, Jr. |
| 5,151,789 A | 9/1992 | Young |
| 5,347,632 A | 9/1994 | Filepp et al. |
| 5,353,121 A | 10/1994 | Young |
| 5,367,571 A * | 11/1994 | Bowen et al. ............... 380/242 |
| 5,440,632 A * | 8/1995 | Bacon et al. ................ 380/242 |
| 5,442,771 A | 8/1995 | Filepp et al. |
| 5,479,266 A | 12/1995 | Young et al. |
| 5,479,268 A | 12/1995 | Young et al. |
| 5,619,274 A * | 4/1997 | Roop et al. .................. 348/461 |
| 6,212,278 B1 * | 4/2001 | Bacon et al. ................ 380/240 |
| 6,564,324 B2 * | 5/2003 | Bacon et al. ................ 713/189 |

* cited by examiner

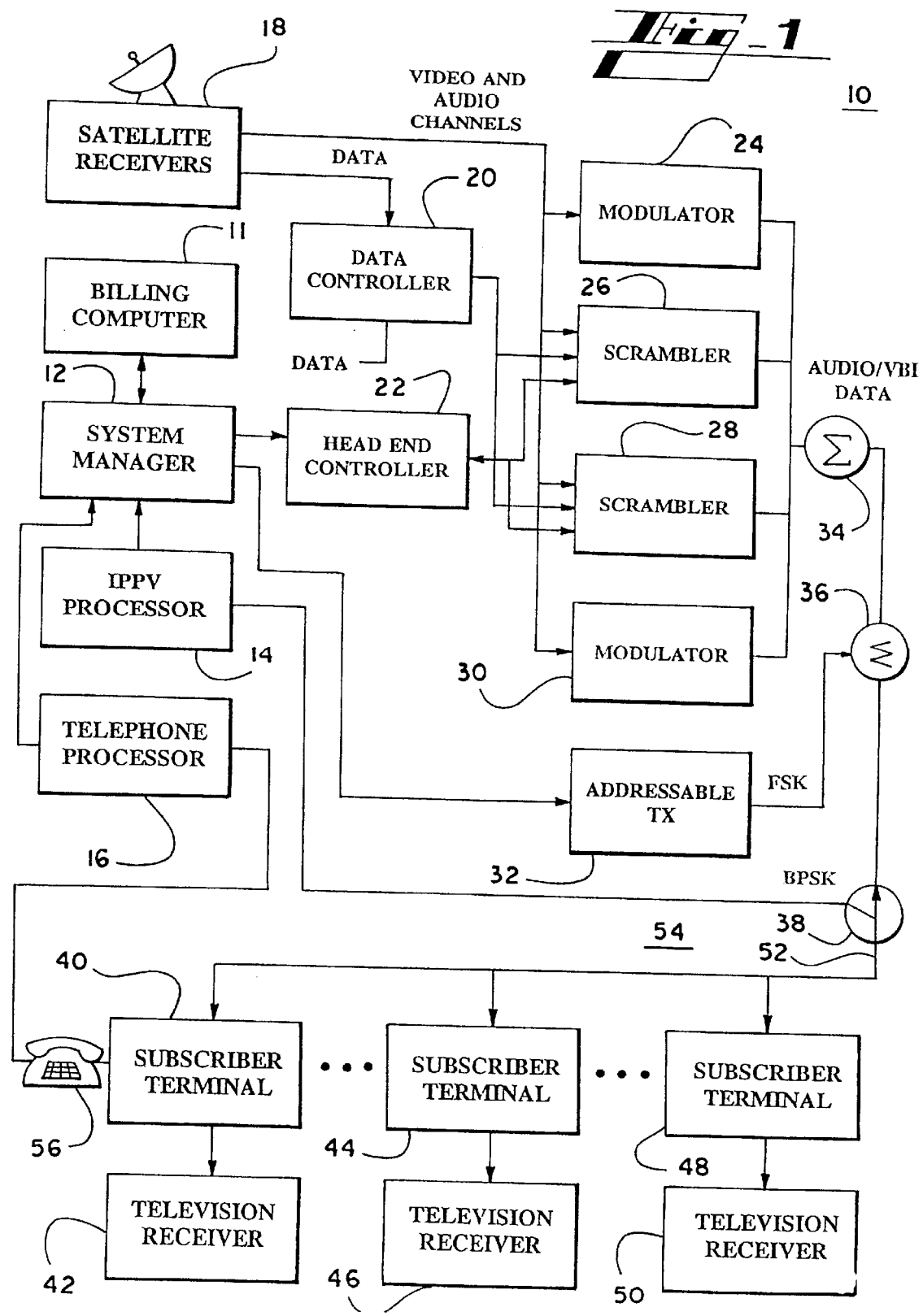

| | |
|---|---|
| 0 | 1 |
| 1 | BLANK |
| 2 | BLANK |
| 3 | BLANK |
| 4 | 0 | 1 | 0 | 0 | BLANK |
| 5 | ID EGPT |
| 6-21 | PARAMETERS DEFINITIONS |

Fig_3C

| | |
|---|---|
| 0-4 | HEADER |
| 5 | ID IAPT |
| 6 | KERNAL REV |
| 7 | INT START BANK |
| 8 | INT STOP BANK |
| 9-10 | INT START ADDR |
| 11-12 | INT FINISH ADDR |
| 13 | INT CODE REV |
| 14-15 | INT NUMBER TRANS |
| 16-21 | FOOTER |

Fig_3B

| | |
|---|---|
| 0 | Ø |
| 1 | ADDRESS 0-7 |
| 2 | ADDRESS 8-15 |
| 3 | ADDRESS 16-23 |
| 4 | ADDRESS 24-27 | 0 | 1 | 0 | 0 |
| 5 | ID EAPT |
| 6 | KERNAL REV |
| 7 | EXT START BANK |
| 8 | EXT STOP BANK |
| 9-10 | EXT START ADDR |
| 11-12 | EXT FINISH ADDR |
| 13 | EXT CODE REV |
| 14-15 | EXT NUMBER TRANS |
| 16-17 | CHANNEL |
| 18 | DRAM SIZE |
| 19 | 0 |
| 20-21 | BLANK |

Fig_3A

| | |
|---|---|
| 0 | Ø |
| 1 | CODE REV |
| 2 | DEST. BANK / DESTIN ADDRESS 12-15 |
| 3 | DEST. ADDR 4-11 |
| 4 | 0 / 1 / 0 / KERNEL REV |
| 5 | ID GDCT |
| 6-21 | PROGRAM CODE |

Fig. 4

| | |
|---|---|
| 0 | 1 |
| 1 | BLANK |
| 2 | BLANK |
| 3 | BLANK |
| 4 | 0 / 0 / 1 / 0 / BLANK |
| 5 | ID IGPT |
| 6-21 | PARAMETERS DEFINITIONS |

Fig. 3D

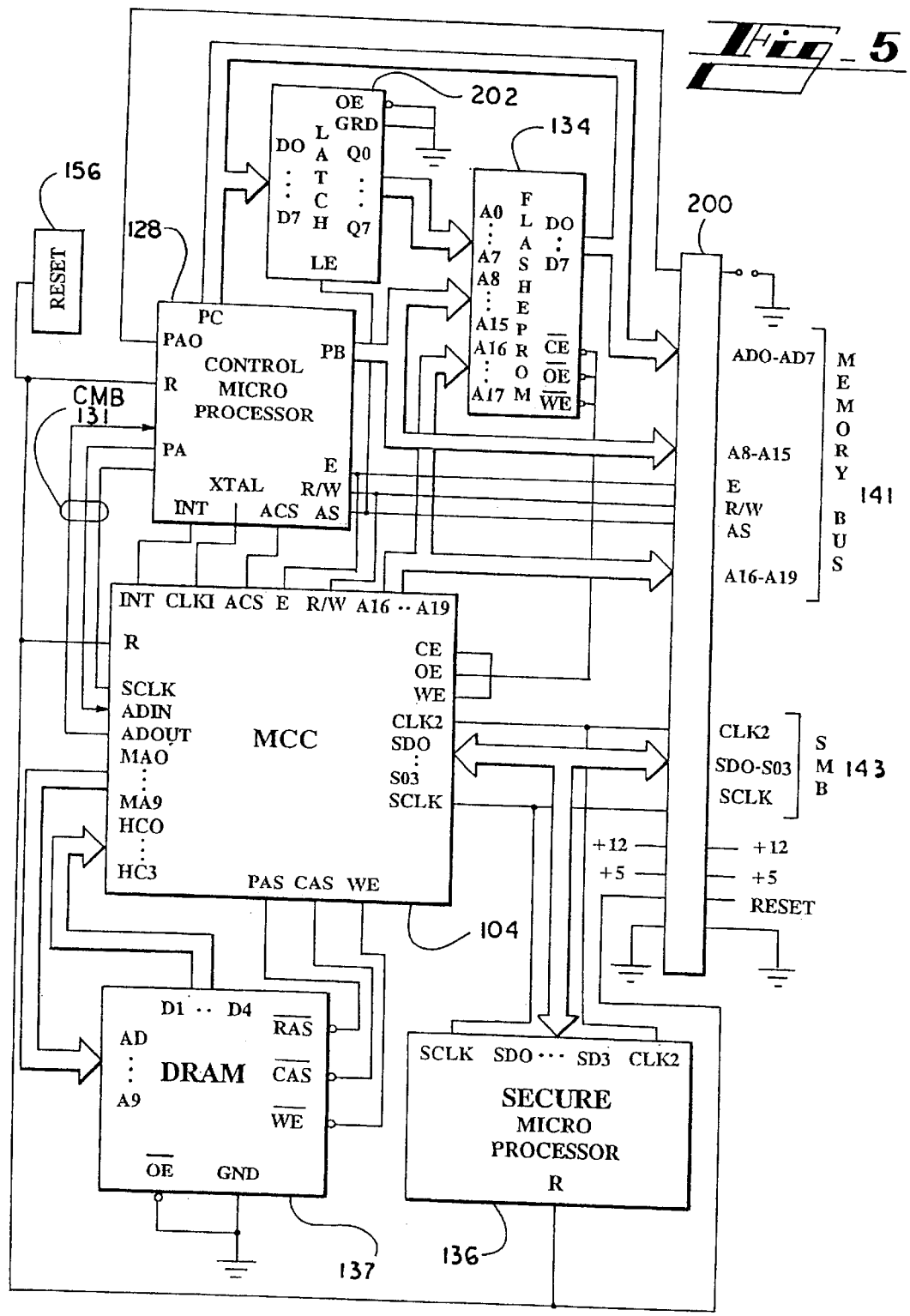
Fig_5

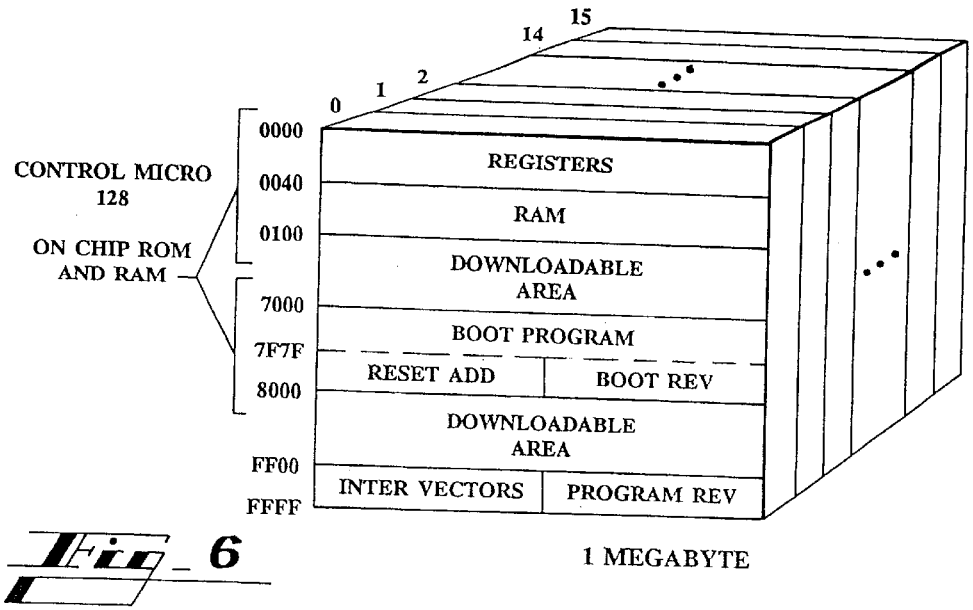
Fig_6
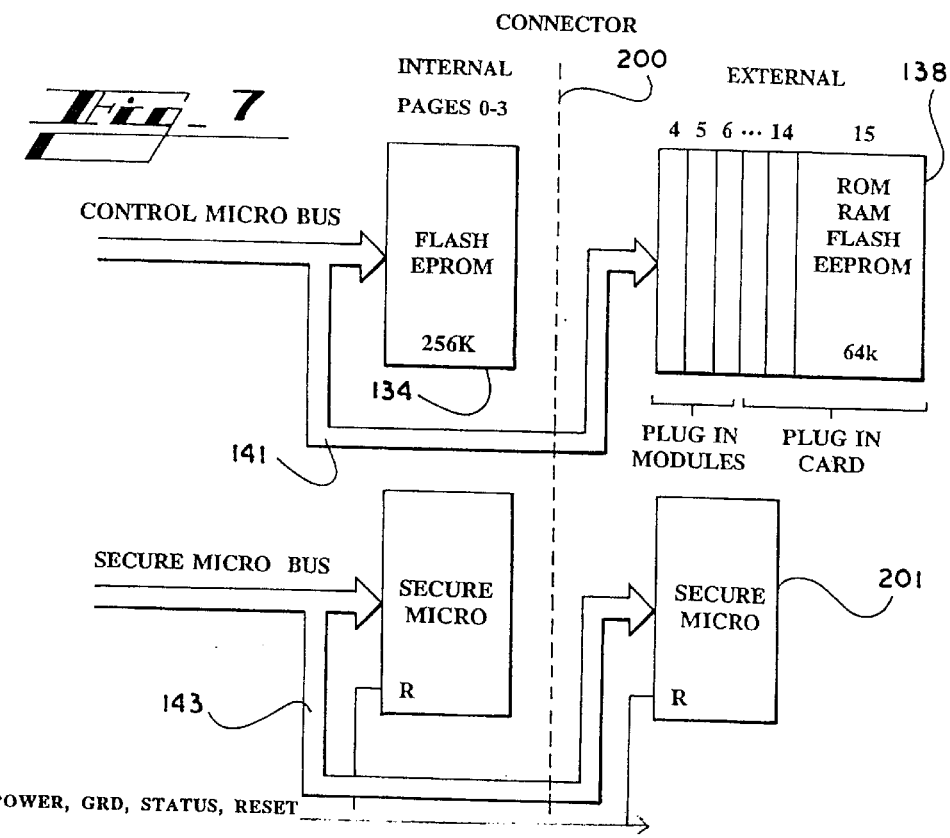
Fig_7

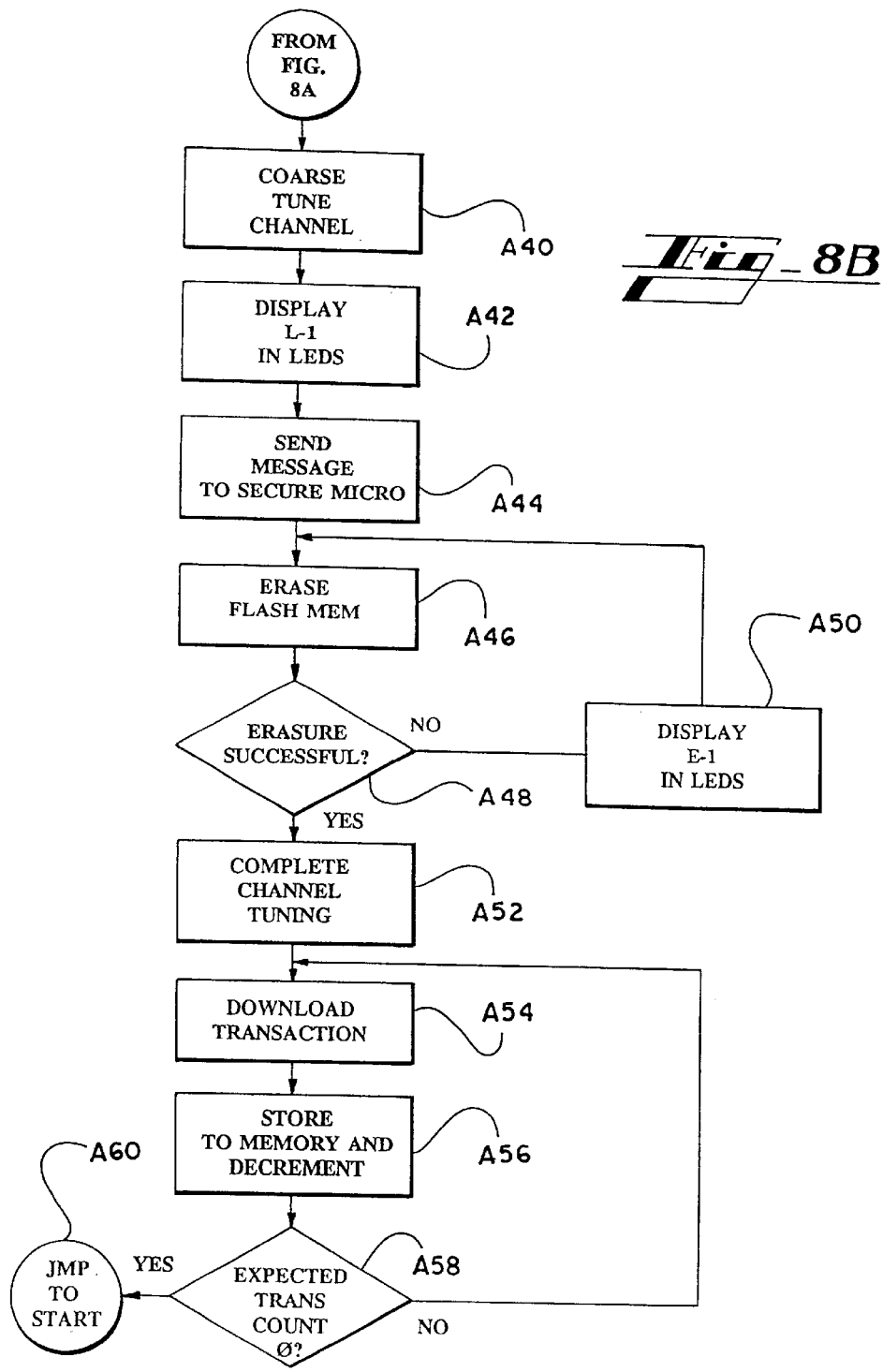

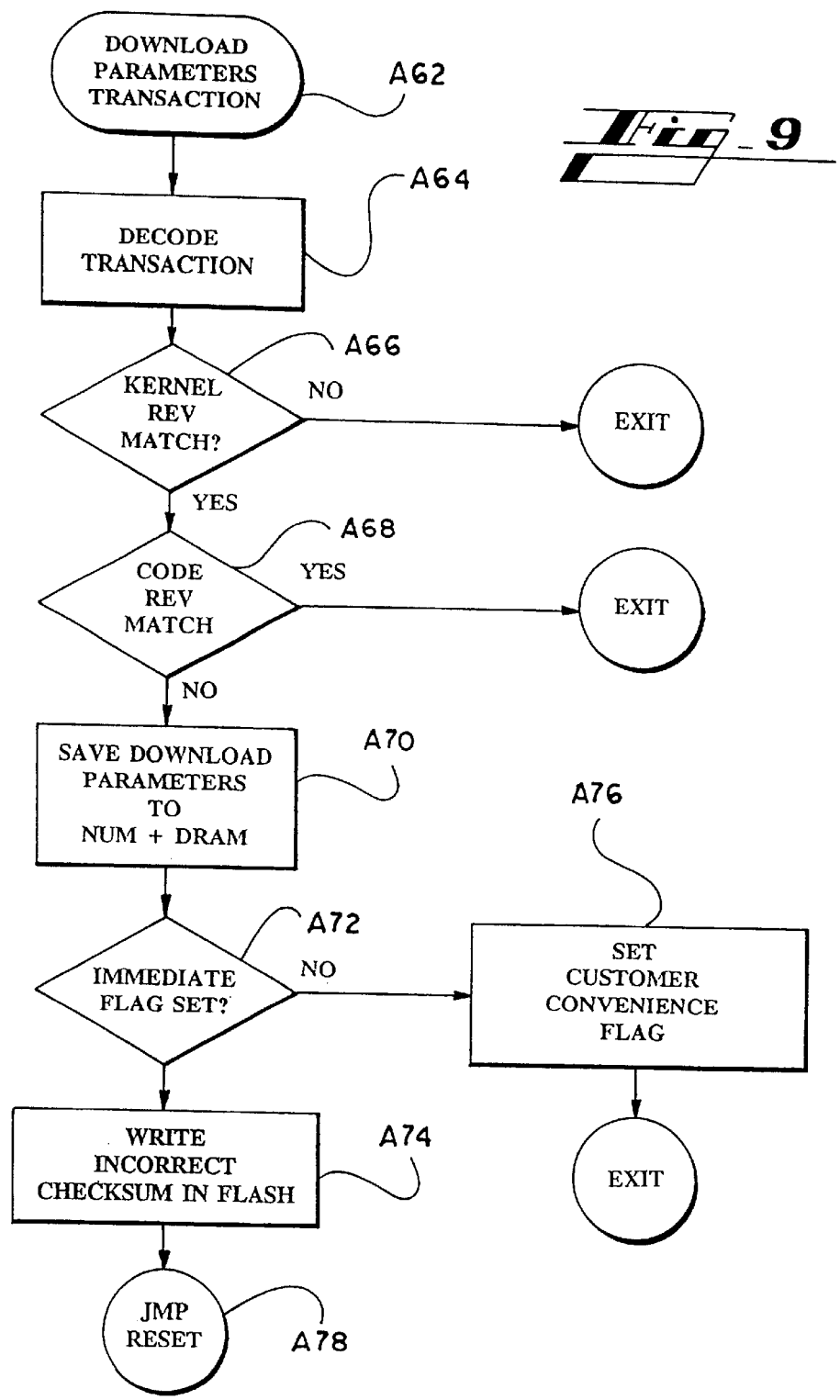

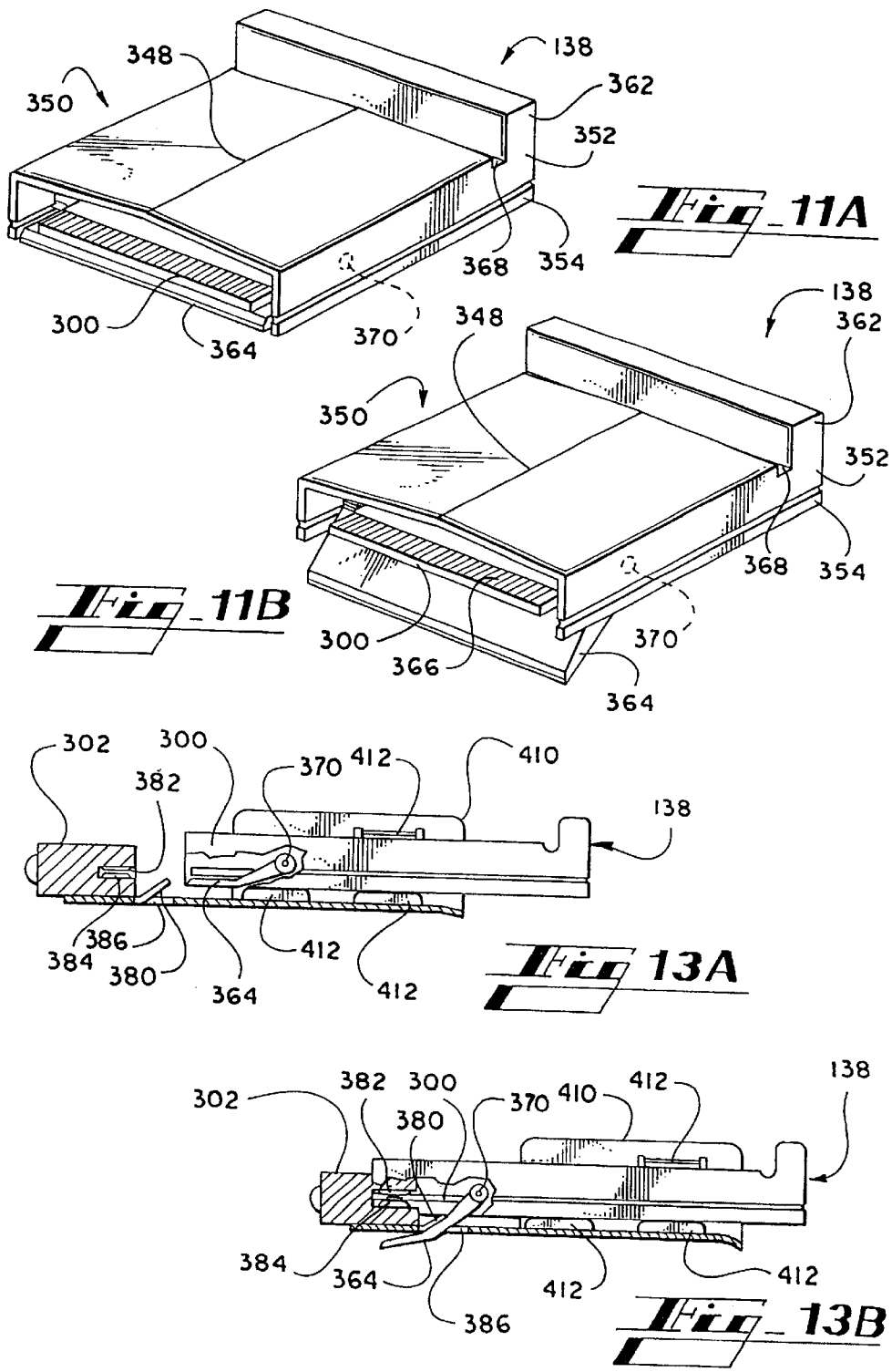

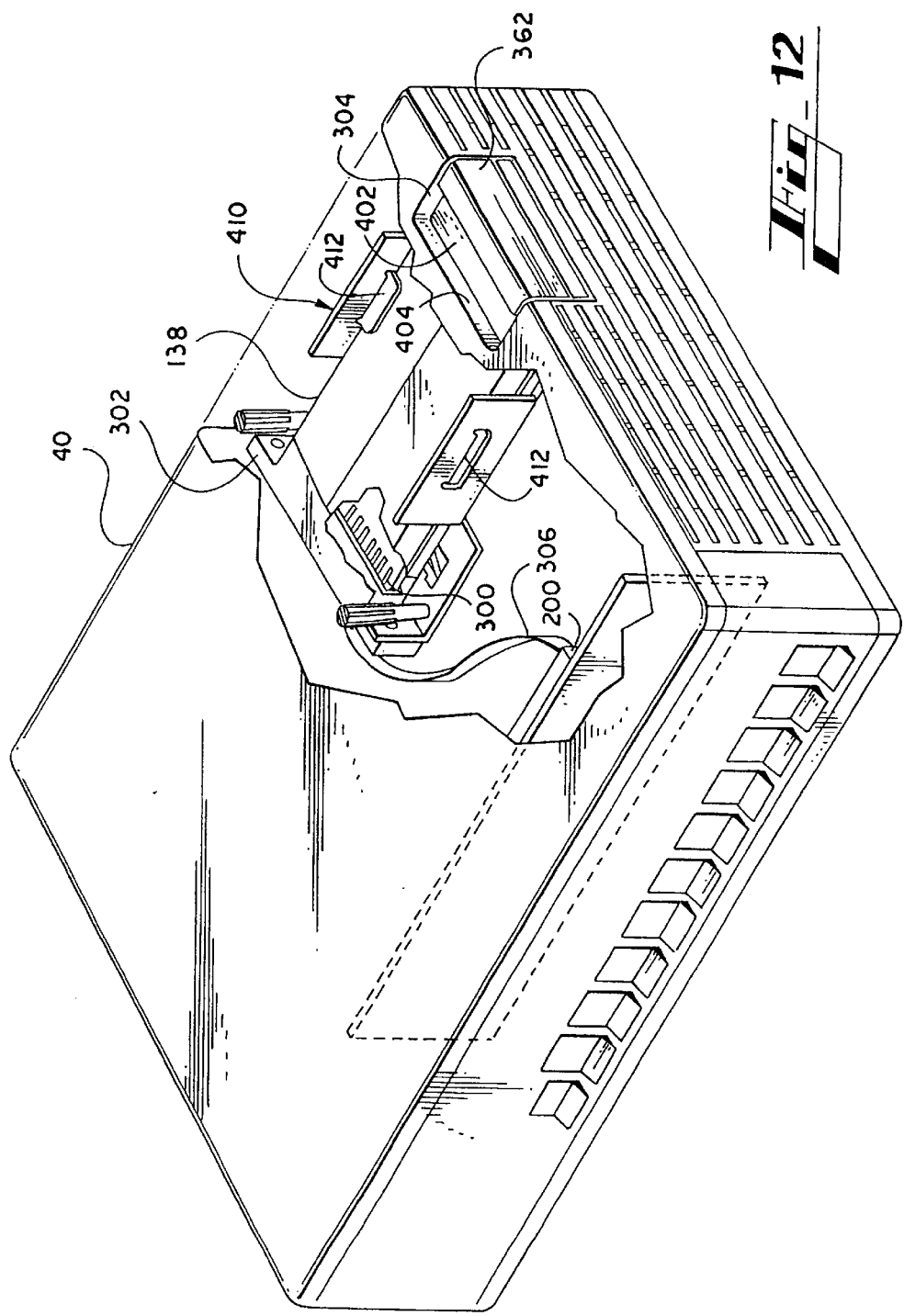
Fig_12

REPROGRAMMABLE SUBSCRIBER TERMINAL

CROSS-REFERENCE TO RELATED APPLICATIONS

This is a continuation of U.S. patent application having Ser. No. 09/748,515 now U.S. Pat. No. 6,564,324 filed on Dec. 22, 2000, which is a continuation of U.S. patent application having Ser. No. 08/480,765 filed Jun. 7, 1995, now U.S. Pat. No. 6,212,278, which is a continuation of U.S. patent application having Ser. No. 08/220,626 filed Mar. 28, 1994, now U.S. Pat. No. 5,440,632, which is a continuation of U.S. patent application having Ser. No. 07/983,909 filed Dec. 2, 1992, now abandoned.

BACKGROUND OF THE INVENTION

The invention pertains generally to a subscriber terminal for CATV or other subscription television systems and is more particularly directed to a method and an apparatus for reprogramming a subscriber terminal.

The subscriber terminal, more commonly known as a set top terminal, is an integral component of subscription television systems. These subscription television systems can be cable television (CATV) systems, SMATV systems, multi-point, multi-distribution (MMDS) systems, or direct-to-home (DTH) systems. The terminals have conventionally provided the functions of tuning particular channels of the subscription television system which are outside the subscriber's television receiver capability. Further, they provide conditional access to the particular subscription service through authorization codes and in many services provide tiering or authorization of particular channels of the service by descrambling.

More recently, the subscriber terminal has become user friendly by providing an interactive, on-screen display and other user functions that allow the subscriber to manipulate the subscription service and his television receiver in additional ways. These features include such things as volume control, pay-per-view event confirmation, favorite channel listings, sleep timer features, parental control capability, messaging, program timers for recording VCR programs, and other consumer friendly operational features.

In addition, some of the features found in newer television receivers can be provided for older receivers by the subscription terminal. For example, channel identifiers, mute and volume control can be accomplished by the subscriber terminal making the subscriber's television receiver appear to be a newer model with these capabilities.

An advantageous example of a subscriber terminal with these advanced consumer features is the 8600 model series of subscriber terminals manufactured by Scientific-Atlanta, Inc. of Lawrenceville, Ga.

Currently, these subscriber terminals are controlled by programmable microcontrollers which have their control programs stored in a read only memory (either integral with the microprocessor or included in a separate integrated circuit) or stored in a separate non-volatile memory such as an EPROM or a battery backed up RAM. With the current programming methods, the control program of the subscriber terminal can only be changed by removing the memory device (or the device incorporating the memory) and replacing it. This method is very inconvenient and expensive for changes which are to be made to subscriber terminals as it means a home visit from the service personnel of the subscription service provider. Subscription television systems may have several hundred thousand subscriber terminals which may need such upgrades.

Therefore, it would be advantageous to be able to reprogram the subscriber terminals of a subscription television service to change on screen parameters, change subscriber interfaces, add new features, and modify the control program from a remote location.

SUMMARY OF INVENTION

The invention provides a method and an apparatus for allowing a subscriber terminal of a subscription television system to be reprogrammed.

The preferred implementation of the subscriber terminal includes a control microprocessor which includes at least a read only memory (ROM) and random access memory (RAM) which is internal to the microprocessor chip. The memory capability of the microprocessor additionally includes several pages of Flash EPROM memory in 64 k blocks which can be mounted internally to the subscriber terminal or externally in the form of plug-in modules. The memory space may include other types of memory which can be reprogrammed.

The subscriber terminal further has a multifunction control circuit (MCC) which controls the input of data to the subscriber terminal from the headend of the subscription television system. The MCC controls a plurality of decoders for in-band video data, in-band audio data, and out-of-band data which it buffers in a volatile memory area. The data which the subscriber terminal receives occurs in defined transactions between the headend and the subscriber terminal. Among the multiplicity of transactions between the headend and subscriber terminal are several to download program code parameters and another to download program code from the headend into the memory space of the control microprocessor. This capability provides a means to change the control program of the control microprocessor to either upgrade it, add additional features, disable obsolete features, or to correct the performance of certain routines of the control program.

In the preferred embodiment, the ROM of the control microprocessor is but a small part of the overall memory space of the processor and contains a loader program and, optionally, several kernel routines. This system code; collectively termed the boot program, is the only part of the memory space which is static and cannot be reprogrammed. In an alternative embodiment, the boot program further contains a revision number so that the control microprocessor may be upgraded by replacement and matched with reprogrammed control program code if so desired. The subscriber terminal is adapted to receive a download program code parameters transaction from the headend which describes the new control code which is to be downloaded into the memory space of the subscriber terminal. The boot program then utilizes these parameters to receive a plurality of download program code transactions which contain the program code to be stored.

In the illustrated implementation, the download program code parameters transaction indicates the expected number of download program code transactions that are to be received by the subscriber terminal, the channel of the subscription system (in-band or out-of-band) where the information is to be found, and the memory space into which it should be stored.

The boot program receives a plurality of the download program code transactions, possibly multiple times. Once a download program code transaction is accurately received, the program code will be stored in the memory space reserved for it and the count of expected transactions decremented. When all the transactions for a particular reprogramming operation have been received, the expected transaction count will be zero and thereby indicate that the downloading operation is complete. In this manner, the downloading operation may be accomplished efficiently even if one or several transactions are not received the first time they are transmitted.

In accordance with another aspect of the invention, the download parameters transactions can be individually addressed, group addressed or globally addressed while the actual download program code transactions are globally transmitted. This operation permits a small set of transactions, the program code parameters transactions, to direct the storage of a much larger set of transactions, the program code transaction. This dramatically decreases the time it takes to encode and decode addressed transactions in the system. This provides for further efficiencies in reprogramming only certain subscriber terminals or groups of subscriber terminals.

Moreover, the program code parameters transactions may contain a program code revision identifier in order to provide other selective criteria on which to determine which subscriber terminals are reprogrammed. In this manner, a current program code version may be periodically transmitted from the headend to update all terminals for system revisions and to initially program new terminals as they are added to the subscriber base. The system operator is then assured that the entire subscriber base is operating with the same program and that revising a terminal's software and initially loading the software do not have to be accomplished by different methods.

According to another aspect of the invention, the program code parameters transactions define the memory space destination to which the new program code is to be downloaded. Conveniently, the memory space may be divided into contiguous areas such as a 64 k bytes, which physically may be separate integrated circuits. This permits selected memory chips to be downloaded rather than the entire memory space. This aspect is advantageous when particular types of memory chips are used such as Flash EPROM memory which must be entirely erased before being rewritten. With this method, only those memory chips which need to be changed are erased.

The memory space definition may also include a designation concerning whether the program code which is to be downloaded is to be stored in an internal memory, an external memory, or both. The preferred subscriber terminal has an expandable memory space which can. be augmented with plug-in modules. By being able to direct the downloaded code to either the internal or external memory, a choice can be made of where to store certain basic control routines as opposed to supplemental features. For example, a core of control routines which provide a basic features set of the subscriber terminal can be stored internally. Other features which are special, or are individually or group directed, can be stored externally. This produces an advantageous subscription television system where all the subscriber terminals have a certain common capability based on a common control program loaded into the internal memory space. If the subscriber or subscriber group does not desire or need any of a special or additional features set, the plug-in modules need not be present and their cost saved.

BRIEF DESCRIPTION OF THE DRAWINGS

These and other objects, features and aspects of the invention will be more clearly understood and better described if the following detailed description is read in conjunction with the appended drawings wherein:

FIG. 1 is a system block diagram of a subscription television system of the CATV type which includes a multiplicity of subscriber terminals;

FIGS. 3A–3D are pictorial representations of several download program code parameters transactions which the system uses to request the downloading of new program code to the subscriber terminal illustrated in FIG. 2;

FIG. 4 is a pictorial representation of the download program code transaction which the system uses to download program code which will supplement or replace program code in the memory space of the subscriber terminal illustrated in FIG. 2;

FIG. 5 is a detailed electrical schematic diagram of the memory architecture of the subscriber terminal illustrated in FIG. 2;

FIG. 6 is a detailed memory map of the memory space created by the architecture illustrated in FIG. 5;

FIG. 7 is a pictorial representation of the separation of internal and external memory for the subscriber terminal illustrated in FIG. 2;

FIGS. 8A and 8B are a detailed flow chart of the boot program stored in the internal ROM of the control microprocessor of the subscriber terminal illustrated in FIG. 2;

FIG. 9 is a detailed flow chart of the program code which stores the download program code parameters transactions for the subscriber terminal illustrated in FIG. 2;

FIG. 11A is a perspective front view of the expansion card 138 illustrated in FIG. 2 with its protective door closed;

FIG. 11B is a perspective front view of the expansion card 138 illustrated in FIG. 2, with its protective door open;

FIG. 12 is a perspective pictorial of the subscriber terminal 40 receiving an expansion card 138 in accordance with the invention.

FIGS. 13A and 13B are fragmentary side views, shown partially cross-sectioned, of the expansion card partially inserted and fully inserted in the carrier of the subscriber terminal shown in FIG. 12.

DETAILED DESCRIPTION OF THE PREFERRED EMBODIMENT

Figure 2A:
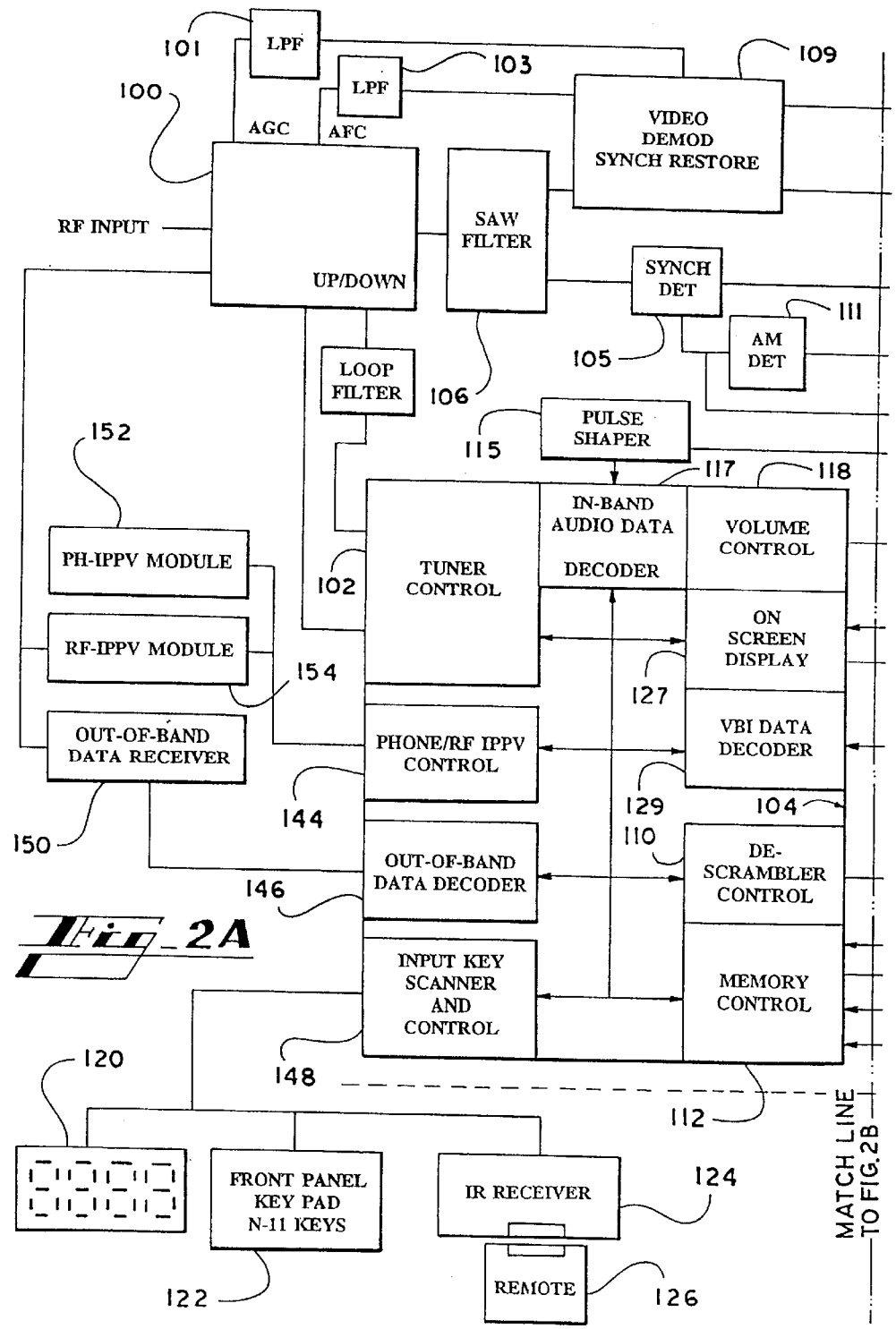
FIG. 2 is a detailed block diagram of one of the subscriber terminals of the system illustrated in FIG. 1.

A subscription television system of the CATV type is more fully illustrated in FIG. 1. The subscription television system includes a headend 10 and a plurality of subscriber terminals 40, 44 and 48 which are connected over a distribution system 52. As is conventional, the distribution system 52 may include coaxial or optical fiber cable, system amplifiers, line extenders, etc. The headend 10 is under the supervision of a system manager 12 which controls a hardware controller, headend controller 22. A billing computer 11 communicates with the system manager 12 to authorize and transmit transactions to subscribers.

The television or other programming for the subscription system may come from a satellite downlink where it is decoded and demodulated by satellite receivers 18 into a number of channels. Each channel is either applied to a modulator 24 and 30 or a scrambler and modulator 26 and 28 which, under the control of the headend controller 22, remodulates the channels to the frequencies of the local subscription system channel line up. For a premium or restricted channel service (tiered, pay-per-view, or the like), some channels are scrambled by any of the known CATV methods by the scramblers and modulators 26 and 28, while the other channels can be transmitted without conversion. The program channels are then frequency division multiplexed onto the distribution system 52 by an RF combiner 34 as a broadband television signal. The plurality of channels of programming can then be transmitted over the distribution system 52 and supplied to each of the subscriber terminals 40, 44, and 48.

The scramblers and modulators 26 and 28 further may include the function of data insertion for its particular channel. This method of providing the data within the channel signal is generally termed in-band signaling. The data may be applied to any audio portion, video portion or both audio and video portions in combination, or any other portion of the television channel. Many subscription television systems have amplitude modulated data pulses on the audio subcarrier. Further, in other subscription television systems, data may be inserted into the vertical and/or horizontal blanking intervals of the video portion.

The data which is inserted into the television channel in this manner can be conditional access data to globally or locally address and control the subscriber terminals 40, 44 and 48, on screen text data, or other types of information from the headend controller 22. Other data and information, such as electronic program guides and information services, can be inserted into the channels from a data controller 20. The data controller 20 can receive local data or national data from the satellite downlink through the satellite receiver 18.

In addition, data can be transmitted over the distribution system 52 by out-of-band signaling. In this mode, the system manager 12 accesses an addressable transmitter 32 with transactions to transmit this data. The addressable transmitter 32 may be used to modulate a data signal on a frequency not associated with the television programming.

The broadband television programming of the cable systems has generally been applied from 50 MHz to 550 MHz and above, while out-of-band signaling systems have been used in non-video portions of these signals, such as at 108.2 MHz with a frequency shift keying modulation technique. These transactions are combined with the broadband television signal at 36 and transmitted to the subscriber terminals 40, 44 and 48.

Transactions in the system are designated as addressed (to a particular subscriber terminal or group of subscriber terminals) and global (to all subscriber terminals). These transactions are in a standardized format which can be sent over any of the communication paths mentioned.

Signaling and data information may also flow in the reverse direction from the subscriber terminals to the headend via a reverse signaling path through the distribution system 52. In one form, the reverse signals are digital biphase shift keying (BPSK) modulated and applied to a frequency below 50 MHz. The signals flow back from the subscriber terminals to an IPPV processor where they are decoded. In addition, any of the subscriber terminals 40, 44 and 48 may include a modem and telephone link 56 to a telephone processor 16 at the headend 10. The information from processors 14 and 16 are directed to the system manager 12, which communicates to the billing computer 11 to obtain authorization and billing information. The reverse signaling system has generally been used for ordering pay-per-view (PPV) or impulse-pay-per-view (IPPV) events. In the future the reverse signal path may be used for any number of additional interactive services.

Figure 2B:
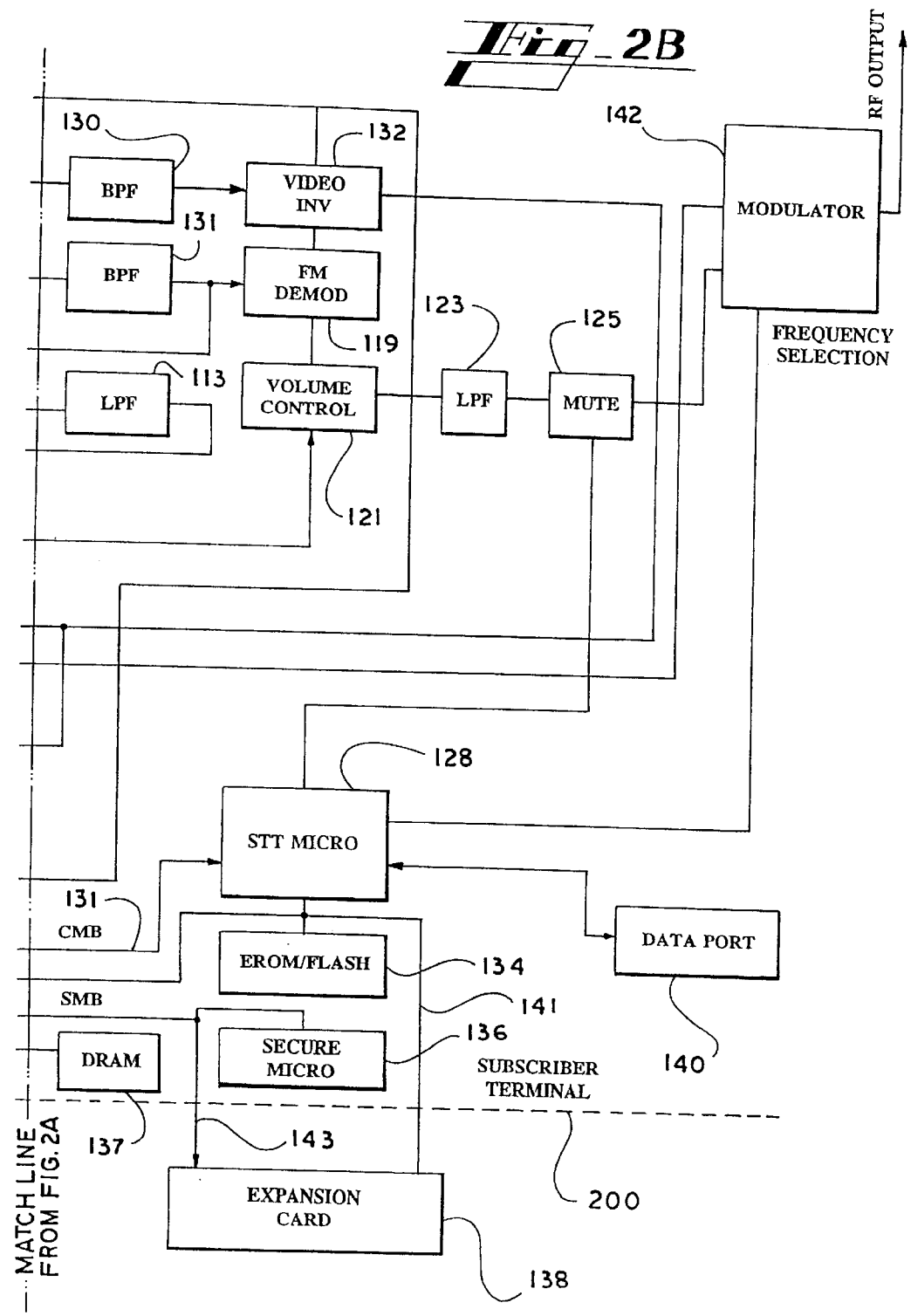

Referring to FIG. 2, a detailed block diagram of one of the subscriber terminals, for example, the one indicated as 40 of the subscription television system will now be described. The broadband television signal from signal distribution system 52 is received at the input of up/down converter or tuner 100. An out-of-band data receiver 150 is also coupled to the broadband input. Conventionally, the up/down converter 100 may include an input filter, such as a diplexer, to separate the 108.2 MHz out-of-band signal and the broadband television signal. The up/down converter 100 can be tuned to a predetermined channel for receiving in-band video and audio data when not in use. The channel may be predetermined from the system manager 12 and, by one of the data transmission methods described herein, the predetermined channel identification can be stored in subscriber terminal 40.

When in use, the up/down converter 100 is tuned according to a channel entered by a subscriber via a user interface having an IR receiver 124, remote control 126 and terminal keypad 122. Up/down converter 100 uses a phase locked loop under the control of a tuning control 102 to convert the selected or predetermined default RF channel signal to a 45.75 MHz intermediate frequency signal. A multifunction control circuit (MCC) 104, preferably an application specific integrated circuit (ASIC) combining many subscriber terminal control and data handling functions into a single package, is linked to up/down converter 100 by a bidirectional link to the tuner control 102. The link has one path for tuning and a return link for feedback control of the tuning process. A feedback signal for automatic gain control and one for automatic frequency control are transmitted to the up/down converter 100 through filters 101, 103, respectively from a video demodulator 109.

A filter, such as a SAW filter 106, filters the IF channel signal to split the signal into separate video and audio portions for further processing. The video portion is demodulated and descrambled by the video demodulator 109 under the control of a descrambler control 110 of the MCC 104. The video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of the descrambler control 110 of the MCC 104. The descrambler control 110 provides the necessary timing signals, inversion axis levels, and whether the video is inverted or not to the video inverter 132 and supplies the necessary timing, restoration levels and identification of sync pulses to be restored to the demodulator 109. The descrambler control 110 usually receives such descrambling information from pulses as in-band audio data.

In the other path, the audio signal is converted from the 41.25 MHz IF carrier to the intermodulation frequency of 4.5 MHz by a synchronous detector 105. Feedback for automatic gain control of detector 105 is supplied from the output of band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by pulse shaper 115. The in-band data, except for descrambling data, is stored in DRAM 137 for buffering. Descrambler control 104 accesses descrambling data directly for the video descrambling operation. Volume control of the audio signal is performed under the control of a volume control 118 of the MCC 104 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and strips the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. The in-band decoder 129 stores the data in DRAM 137 prior to processing by the microprocessor 128, the DRAM 128 serving as a data buffer.

The output of video inversion circuit 132 is also supplied to an on screen display control 127 of the MCC 104. The on screen display control 27 selectively generates on screen character and graphic displays in place of or overlaid on the video signal. The modulator 142 combines the video signal from the output of the on screen display control 127 and the audio signal from the output of the mute circuit 125 and converts the combined signal to the channel frequency selected by the microprocessor 128, such as channel 3/4 for NTSC. The combined and remodulated signal is supplied as an RF output to a television receiver in well known manner.

A control microprocessor 128 controls the overall operation of the subscriber terminal 40. The subscriber communicates to and controls the microprocessor 128 through an interactive user interface with an on screen display. The user interface includes a keyboard 122 on the front panel of the subscriber terminal 40 and the remote 126 which generate subscriber control signals for channel tuning, volume level control, feature selection, and the like. These subscriber control commands are decoded by an input scanner and control 148 of MCC 104. The remote IR receiver 124 of the user interface receives the commands from the infrared (IR) or other remote control 126, as is well known in the art, and provides commands to the microprocessor 128. The user interface additionally includes a 4 digit, 7 segment LED display 120 which displays the tuned channel numbers and diagnostics.

When the keypad 122 or IR remote control 126 is utilized to select a command, the microprocessor 128 operates to execute the command. For example, this operation may be to instruct the tuner control 102 to appropriately control up/down converter 100 to tune a selected channel. The subscriber terminal interacts with the subscriber by providing numerous on screen displays which assist in the operation of the terminal. The on screen displays provide information and prompts to guide the subscriber through many of the complex features of the terminal.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of MCC 104 carries out descrambling on a particular channel or what form of descrambling is required at a particular time by interpreting the authorization and control data downloaded from the system manager 12 (by any of the three data transmission schemes discussed herein, out-of-band, in-band audio or in-band video) into the internal NVM memory of the device. The non-volatile memory (NVM) in the secure microprocessor 136 stores secure data, for example, authorization data, scrambled channel data, scrambling mode data, some terminal configuration data and other required data.

The control microprocessor 128 operates by running a control program which preferably is partially stored in a read-only memory internal to the processor and partially stored in a non-volatile memory such as Flash EPROM memory 134. In addition, the control program of the control microprocessor 128 may also reside in the non-volatile memory of an expansion card 138. The microprocessor 128 communicates with the non-volatile memory 134 and 138 via a memory bus 141 which has data, address, and control lines. In addition, the microprocessor 128 controls the data decoders 117, 129 and 146 and the tuner control 102, volume control 118, on screen display control 127, descrambler control 110 and input key scanner and control 148 via commands through MCC 104 and control microprocessor bus (CMB) 131. The microprocessor 128 also directly controls the mute switch 125 and the output frequency selection of the modulator 142. The microprocessor 128 includes additional capacity for other auxiliary device communications and control through a data port 140.

The memory control 112 permits data coming from the three data decoders 117, 129 and 146 to be placed in a volatile memory such as DRAM 137. There it can be accessed by the control microprocessor 128 via the CMB 131. The MCC 104 also distributes control instructions from the control microprocessor 128 to the other parts of the MCC 104 to provide operation of the rest of the subscriber terminal 40. The MCC 104 additionally connects to a secure microprocessor bus (SMB) 143 which permits communications between the secure microprocessor 136 and other portions of the subscriber terminal 40. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests to write to memory or read from memory from the microprocessors 128, 136 and the other controls and data decoders. It resolves contentions for memory transfers, giving priority to real time applications and the microprocessors, and schedules the data flow. The microprocessors 128 and 136 communicate through internal registers of the MCC 104 with the memory control 112 and other portions of the MCC.

The expansion card 138 is a printed circuit card which contains memory and/or secure microprocessor components, which can be plugged into a connector 200. The connector 200 electrically extends the control microprocessor memory bus 141 and the secure microprocessor bus 143 to the expansion card 138. Additional program or data memory, or renewed security can be provided by the expansion card 138.

The subscriber terminal may optionally include an impulse pay-per-view (IPPV) module of either the telephone type 152 or the RF-IPPV type 154. The IPPV module allows the subscribers to request authorization of their subscriber terminal 40 to receive pay-per-view events, store the data associated with the purchase of the event in the non-volatile memory of the secure microprocessor 136, and then transmit the data to the system manager 12 via the telephone return path or the RF return path via the signal distribution system 52.

The memory space of the subscriber terminal can be downloaded with new program code through a series of transactions including a download parameters transaction and a download program code transaction. The download parameters transaction for the subscriber terminal illustrated in FIG. 2 is more fully shown in FIGS. 3A–3D. The download parameters transaction is 22 bytes in length and has four versions. A first version (FIG. 3A) is for external memory configurations and a second version (FIG. 3B) is for internal memory configurations. Either of these transactions may be addressed (FIGS. 3A, 3B) or global (FIGS. 3C, 3D) to provide versions three and four.

The addressed version of the download parameters transaction for external memory configurations will now be more fully described with respect to FIG. 3A. Bit 1 of byte 0 of the transaction indicates that it is an addressed transaction, and bytes 1–3 provide 24 bits of addressing capability. Additionally, byte 4 has a least significant nibble which adds 4 more bits of addressing capability. Thus, the transaction may address $2^{28}$ subscriber terminals in the customer base of the subscription system. The most significant nibble in byte 4 includes a code 0100 which indicates the transaction is directed to the secure microprocessor 136. Byte 5 is reserved for a transaction identifier code which indicates it is an external, addressed, parameters transaction (EAPT).

After this header information, bytes 6–19 provide parameter definition information concerning the downloading of program code to the memory space. The least significant nibble in byte 6 includes a code that identifies the kernel revision for the boot program in the microprocessor 128. Bytes 7 and 8 indicate the number of the starting bank and number of the ending bank for the external memory. Bytes 9 and 10 are the first address of the starting bank of external memory and bytes 11 and 12 are the last address of the end bank of external memory. Byte 13 is the program code revision number and bytes 14 and 15 are the expected number of downloadable transactions that it will take to load the code. Bytes 16 and 17 indicate the frequency of the channel on which the downloadable program code transactions will be transmitted. Byte 18 is an indication of the volatile memory size, in this case the size of the DRAM 137. Byte 19 is an indication of whether the system is commanding an immediate software download or whether the downloading should occur sometime in the future.

The addressed download parameters transaction (FIG. 3B) for the internal memory (IAPT) is identical in the header section (bytes 0–4) to the addressed transaction for external memory (FIG. 3A). The structure is also similar in that there are indications in bytes 7–12 for the internal starting bank and internal ending bank, along with their first address and last address. Additionally, the program code revision for the internal memory is stored in byte 13 of the transaction and the expected number of downloaded program code transactions is provided in bytes 14 and 15. The footer (bytes 16–21) are also similar to the internal transactions.

The global download parameters transaction versions (FIGS. 3C, 3D) of the addressed transaction versions differ only by having a zero in bit 1 of byte 1, no address, and different transaction identifiers. The parameters definitions, bytes 6–21, contain the same data in the same format for both addressed and global transactions.

The download program code transaction is more fully illustrated in FIG. 4. The first bit in Byte 1 is a zero indicating that the download program code transaction is a global transaction. The transaction could be addressed but sending large amounts of addressed transactions taxes the system assets. Byte 2 of the transaction indicates the code revision number. Byte 3 indicates the destination bank (page) for the particular memory configuration and the most significant nibble in byte 3 and all of byte 4 are used for address bits 4–15 of the bank. Because there are 16 bytes of code in each program code transaction, the destination address points to the first address of a 16 byte segment. The first byte is loaded at this address in the destination bank and the following bytes loaded sequentially in the same sequence that they are stored in the transaction. In this manner 16 banks of 64 k memory can be reloaded by a very simple transaction. Bytes 5 has a nibble which indicates that the transaction is directed to the control microprocessor 128 and the second nibble of the byte indicates the kernel revision for the transaction. Byte 6 indicates the transaction is a download program code transaction. Bytes 6–21 are the actual program code bytes which are downloaded to the control microprocessor memory space. Each transaction loads 16 bytes of code into the memory space of the subscriber terminal 40.

In this manner a large amount of program code (1 megabyte) can be efficiently and accurately downloaded to the memory space of the subscriber terminal 40. By having the download parameters transaction either addressed or global, internal or external, the system allows for an efficient addressing of the program code to either all terminals, a group of terminals or even a single terminal. By indicating which code revision is acceptable to the terminal and indicating the code revision in the download transaction, the addressed terminals may even be further downloaded with different revisions or the same revision for a different microprocessor. Also the inclusion of the kernel revision provides for the update of the control microprocessor 128 or a new model to allow compatible code conversion. Moreover, the distinction between internal and external memory can be used to direct program code as necessary.

Normally, the headend 10 will be constantly broadcasting a standard software program that all subscriber terminals should be using. This program code advantageously can be addressed to all terminals by a global download parameters transaction which may indicate it is for internal or external memory. New terminals as they enter the subscriber base are automatically downloaded with the correct software by these transactions. Code revisions to the entire subscriber base can be made by a global download parameters transaction with a new revision number stored therein. The system supports different kernel revisions so that different models of subscriber terminals may be used in the same system. The addressed parameters transactions may then be used to reach smaller groups, or even single terminals, with special software. It is envisioned that the headend will broadcast several versions of software simultaneously and the download parameters transactions will be used to allow the subscriber terminals to select the one for its particular purpose.

The memory space and memory control of the subscriber terminal 40 will now be more fully described with reference to the schematic in FIG. 5. The memory space of the control microprocessor 128 is shown as I megabyte in length. The control microprocessor 128 uses address lines A0–A19 to be able to reach this size of memory in blocks or pages of 64 k bytes. Addresses A0–A15 are addresses found on a particular 64 k page which are then designated by the extended addresses A16–A19 from MCC 104.

The physical memory of the memory space can be either internal or external. Internal memory for this implementation means fixed and not removable. The external memory for this implementation indicates memory space which can be expanded by adding one or more modules of removable memory. In the preferred embodiment, this is accomplished by an expansion connector 200 which accepts an external plug-in module. The expansion can take the form of an expansion card connector or individual plug in connectors which will receive printed circuit boards mounting the modules on board.

The control microprocessor 128 generates the page addresses A0–A15 from 2 bidirectional 8 bit I/O ports PB and -PC. The microprocessor 128 time multiplexes the port C lines to be both address and data lines AD0–AD7 and applies them to a data latch 202 which maintains the address word while it reads data from the same lines. The address lines are applied to the address inputs A0–A15 of the internal memory 134, in FIG. 5 a 256 k Flash EPROM (pages 0–3). Data from the memory 134 is output from its data outputs D0–D7 on the port C data lines AD0–AD7. The extended address lines A16 and A17 needed by the memory to address the 64 k pages of memory are provided by the MCC 104 to determine page assignment. Additionally, the MCC 104 provides the control signals to the chip enable input *CE, output enable input *OE, and write enable input *WE to the memory device 134.

The microprocessor 128 communicates with the MCC 104 over a serial bus with a transmit line connected to the address in input ADIN and a receive line connected to the address input ADOUT. An address clock on line ACLK provides a clock signal to synchronize the transfer of data between the microprocessor 128 and MCC 104. A chip select signal ACS is used to select the MCC 104 and to separate control data. The MCC 104 also has a connection to the enable output E, and the read/write memory line R/W of the microprocessor 128. The MCC 104 further provides a master clock signal CLK1 to the XTAL input of the microprocessor 128 to run the device. The MCC 104 provides a data ready signal INT which is coupled to the interrupt input of microprocessor 128 to indicate that transaction data has been received and is stored in DRAM 137.

The DRAM 137 is controlled by the memory controller 112 of MCC 104 via address lines A0–A9, row address strobe *RAS, column address strobe *CAS, and a write enable signal *WE. Data in 4 bit half bytes is read from and written to the data terminals D1–D4 of the memory device by the memory controller 112. The output enable input *OE and ground input to the DRAM 137 are-grounded. The secure microprocessor 136 communicates over the secure microprocessor bus (SMB) with the MCC 104. The SMB comprises 4 input/output data lines SD0–SD3 and a serial clock line SCLK to time the communications. The memory controller 112 additionally provides a master clock CLK2 to run the secure microprocessor 136.

Extensions of the control microprocessor memory bus 141 are provided by the memory extension connector 200. This extension connector is a 34 pin, edge connector which can be connected to other printed circuit boards within the subscriber terminal cover (on board) or provided to plug-in devices external to the subscriber terminal such as the expansion card 138. The expansion connector includes the address and data bus of the microprocessor 128, lines AD0–AD7 and lines A8–A15. Further, the extended address lines A16–A19 are provided to the extension connector 200 from the MCC 104. In addition, the expansion connector 200 is electrically coupled to the SMB 143, which provides the serial clock SCLK and input/output data lines SD0–SD3 to devices coupled to the connector. Still further, control lines from the microprocessor 128 including the enable output line E, the read/write line R/W, and the address strobe line AS are coupled to the connector 200. The microprocessor 128 reads an input port line PAO to tell whether the expansion card 138 is inserted in the connector. The input port line is connected to a pin of connector 200 which can be grounded when the expansion card 138 is inserted. The expansion connector 200 is supplied with +12V, +5V power connectors and ground for the circuit components on the expansion card 138. In this manner, those devices which are inserted in one or more connectors coupled to the extension connector 200 appear to be electrically present in the memory space of the subscriber terminal 40.

Thus, the memory can be divided into internal and external memory as seen in FIG. 7 where, based on the feature set and the length of the control program, the internal memory 134 can be reduced to a minimum. Additional feature sets or special features for only certain subscribers or groups of subscribers then may be provided by plug-in modules with the additional costs born by those subscriber benefitting and paying for the additional features. The connector 200 can support multiple modules or a single module such as expansion card 138. The expansion connector 200 also provides for renewable security by providing the secure microprocessor bus SMB 143 as a connection to the expansion space. Another secure microprocessor, such as that illustrated as 201, can be plugged into the connector 200 as an on board module or mounted on the extension card 138. The system reset line R is connected to the expansion connector 200 and the microprocessor 201. This secure microprocessor 201 may then take the place of (or supplement) the operation of the secure microprocessor 136 in the system.

FIG. 6 illustrates the configuration of the memory space of the control microprocessor 128. The space is configured into 64 k blocks or pages of memory of which there are 16 blocks, 0–15. Each memory block addresses 0000–FFFF hexadecimal and generally is implemented by a single integrated circuit device, either a ROM memory, a battery backed up RAM memory, a Flash EPROM memory, or EEPROM memory. This address separation makes it easier to control the process of executing the control program and enabling the devices. The total memory size in this application may be up to 1 megabyte and is configured in this manner for convenience. It is evident that additional memory or a different configurations can be made to the memory space without varying the invention.

Each memory block has certain reserved spaces for system operation including addresses 7000–7FFF hexadecimal (hex). This partition is used as internal memory space to the control microprocessor 128 and contains a boot program. Additionally, at address 7F7F hex, the code contains the reset address and the revision code number of the particular microprocessor and boot program. Addresses 0000–0040 hex are reserved for the hardware registers of the control microprocessor 128 and the memory space 0041–00FF hex is reserved for the internal random access memory of the control microprocessor 128. These addresses are unusable in any of the other pages and refer only to the internal physical memory space of the control microprocessor 128. In addition, the 16 memory spaces at the end of each page, FF00–FFFF hex, are used to store interrupt vectors and the revision of the present program control code. Memory space from 0100–6FFF and 8000–FEFF hex is used to provide space for the control program of the microprocessor 128. This memory space may be downloaded by the method described herein. Further, the memory space of these pages may be internal (located on a printed circuit board in the subscriber terminal 40), external (supplied on the expansion printed circuit card 138), or both. Any combination of types of memory may be used to advantage and the invention should not be limited to a particular hardware configuration. Preferably, however, the subscriber terminal 40 has 1–16 pages of Flash EPROM memory which can be downloaded by the technique herein described. The implementation shown illustrates 4 pages of internal Flash EPROM memory with extra pages being mounted externally. The additional pages 4–15 can be located on board in plug-in modules or on the expansion card 138.

The control microprocessor 128 contains the boot program in its internal ROM which, upon start up or reset, will initialize the subscriber terminal 40 and initiate the control program of the control microprocessor 128 from the correct starting address. The boot program also provides a loading routine for the downloading of new control code, either into the internal non-volatile memory of the subscriber terminal 40, such as Flash EPROM memory 134, the external memory on the expansion card 138, or both. The boot program comprises an initialization and loading program and several kernel routines.

Figure 8A:
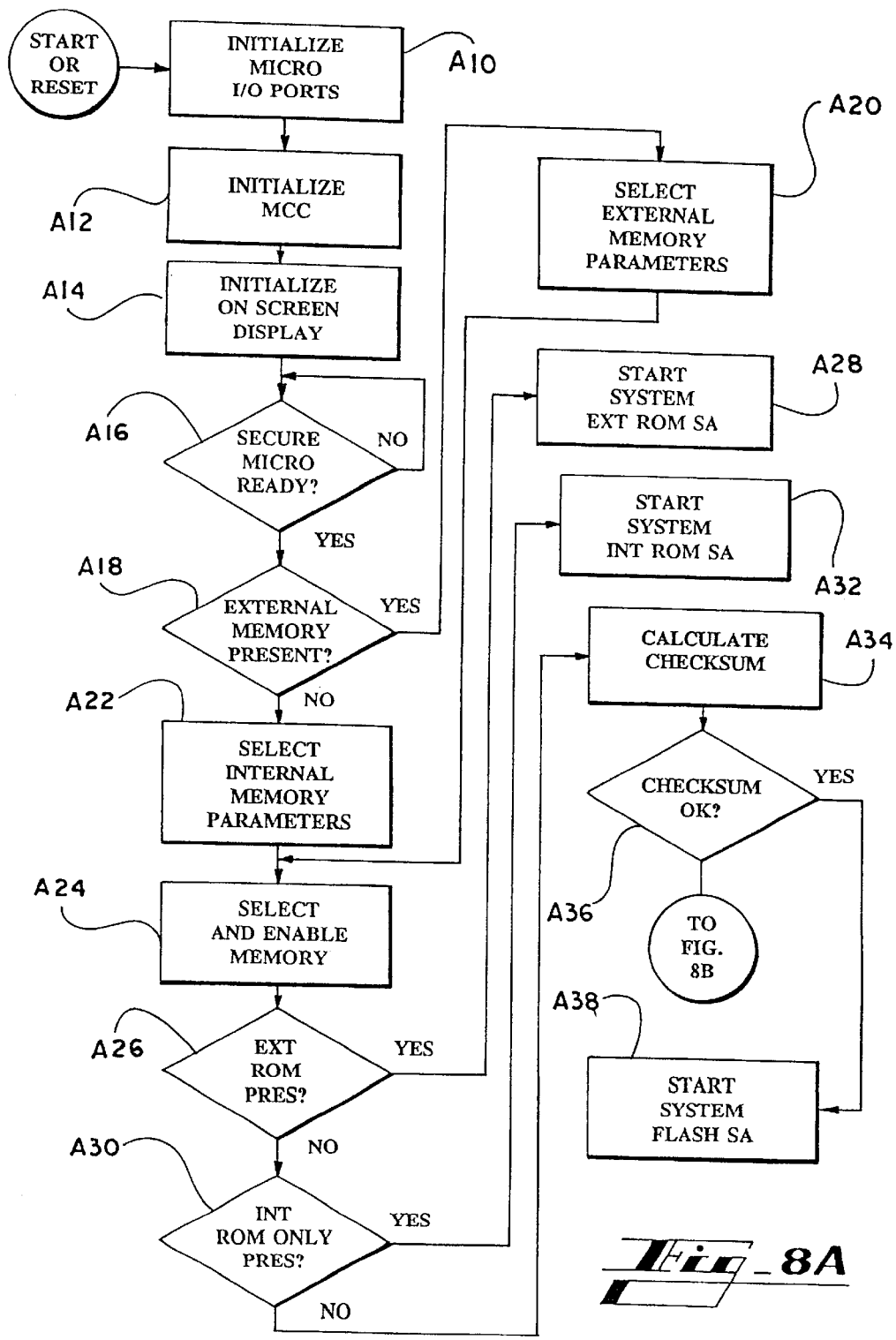

The boot program will now be more fully explained by reference to its system level flow chart illustrated in FIGS. 8A and 8B. Upon initialization or reset, the control microprocessor 128 begins executing instructions at block A10. In that block, the microprocessor 128 initializes all the input/output ports of the device so that it can communicate with the remaining portions of the terminal. Next, in block A12 the MCC 104 is initialized to allow further communications with and control of the other devices in the subscriber terminal 40. Additionally, the microprocessor 128 in block A14 will cause the MCC 104 to provide initialization for the on screen display through the on screen display control 127. The microprocessor 128 will then check to determine whether the secure microprocessor 136 is ready to communicate and receive instructions. If the secure microprocessor 136 is not ready, the microprocessor 128 will loop back to the entry of block A16 until it receives an indication that the secure microprocessor has been initialized.

After this indication is received, the program will begin a series of tests for its physical memory configuration. In block A18 the program will test to determine whether there is an expansion card 138 present. The test is performed by testing the state of the logic signal on port pin PA0 of the microprocessor 128 which is tied to connector 200. If the expansion card is present, then the system parameters of the device are set to external values to allow communication with and control of the circuitry on the expansion card 138. If it is determined the expansion card is not present, then in block A22 the system parameters are set to internal values. With this task accomplished, the microprocessor 128 will then select and enable the memory configuration which it has determined is present in block A24. In block A26, it is determined whether there is external ROM present by checking the configuration parameters of the expansion card 138.

If there is external ROM present, then the control program will start at the external ROM start address in block A28. The external ROM start address was a parameter which was stored when the system determined that external ROM was present. If, however, internal memory is only ROM, then the system will start at the internal ROM start address in block A32.

This permits a facile method of selecting-system operation. If external ROM is present, this indicates external programming and the subscriber terminal will begin executing code there to pass control to the subscriber terminal 40 to the external module. Different plug-in modules can then provide entirely new features and operations of subscriber terminal 40. Unplugging the module will cause failure of the test in block A26 and reversion to the internal software. If there is only internal ROM, this indicates there is no space to download program code, and the rest of the boot program should not be used.

If neither external ROM nor internal ROM only is present, that means that the system should start from an address in the downloadable section of the memory space, in which the preferred implementation is Flash EPROM memory. Therefore, the negative branch from block A30 will begin a checksum calculation of the Flash EPROM memory, both internal and external in block A34. If this checksum calculation is successful then in block A38 the system will start from a FLASH system start address.

If, however, the checksum test is failed in block A36, the control microprocessor 128 will determine that program code should be downloaded. The microprocessor 128 will begin to look for download program code transactions with which to reload the Flash EPROM, or other non-volatile memory, of the memory space. This starts in block A40 by initially coarse tuning the channel with downloadable program code information on it. Additionally, a communication (L-1) is displayed in the LEDs of the subscriber terminal 40 indicating that the terminal is downloading software. Further, a communication to the secure microprocessor is made in block A44 to notify it of the present status. Thereafter, in block A46 all flash memory is erased and tested in block A48 to determine whether the erasure was successful. If the erasure was not successful a loop is formed to try to erase the memory.

A display of (E-1) in the LEDs indicates that the attempted erasure of the memory has not been successful. When the erasure is successful, the program will fine tune the frequency of the tuner 100 in block A52 to the channel on which the downloadable program code transactions are to occur. The terminal will then download program code transactions until it decrements the expected transactions count to zero. In block A56 when the transaction count becomes zero, the program will jump back to its starting point in block A10, initialize the hardware, and start the control program at the designated start address of the new configuration and control program.

FIG. 9 is a detailed flow chart of the program code which is used to download the parameter transactions. This program code is executed by the control microprocessor 128 and may be located in the downloadable memory space of the system. The flow chart is exemplary only and many other types of programs to control the downloading of software can be devised from the teachings of the invention. The control microprocessor 128 enters this section of code in block A62 by recognizing an interrupt from the MCC 104 which indicates that it has data, and possibly a transaction, for the microprocessor. The control microprocessor 128 loads the data, and recognizes it as a download parameters transaction in block A64. The data in the transaction is tested to determine whether (in block A66) it has the correct kernel revision. If the kernel revisions do not match, then this parameters transaction for downloading the code is not for this microprocessor and the program exits. If the kernel revisions do match, the program path flows through to block A68 and a determination is made whether the program code revisions match. If the code revisions match, that means that the code revision that the parameters transaction is attempting to download is already in the memory space of the control microprocessor 128. Therefore, the program exits.

If, on the other hand, the code revisions do not match then the control microprocessor 128 will save the parameters from the transaction in the NVM of the secure microprocessor 136 and the DRAM 137. Next, the microprocessor 128 tests to determine whether or not the immediate flag is set in block A72. If the immediate flag is set, the system operator has determined that downloading of the code should take place at the same time that the parameters transaction is received. This will cause the subscriber terminal 40 to go into a downloading mode no matter what else the subscriber terminal is doing. If the immediate flag is set the checksum in the Flash memory is written incorrectly and the program then jumps to the reset address in block A78. By writing the checksum in the Flash memory incorrectly the system causes the boot program to start its loading program.

The subscriber terminal 128 may, however, be engaged in an interactive session with the subscriber or may be doing something the subscriber does not wish to be interrupted, such as recording a premium event that he has paid for. Therefore, unless the subscriber terminal 128 needs to be downloaded immediately, it is more consumer friendly to allow the downloading to take place at the convenience of the subscriber. Thus, in block A72, if the immediate flag is not set, the program will flow to block A76 where a subscriber convenience flag is set before the program exits.

Figure 10:
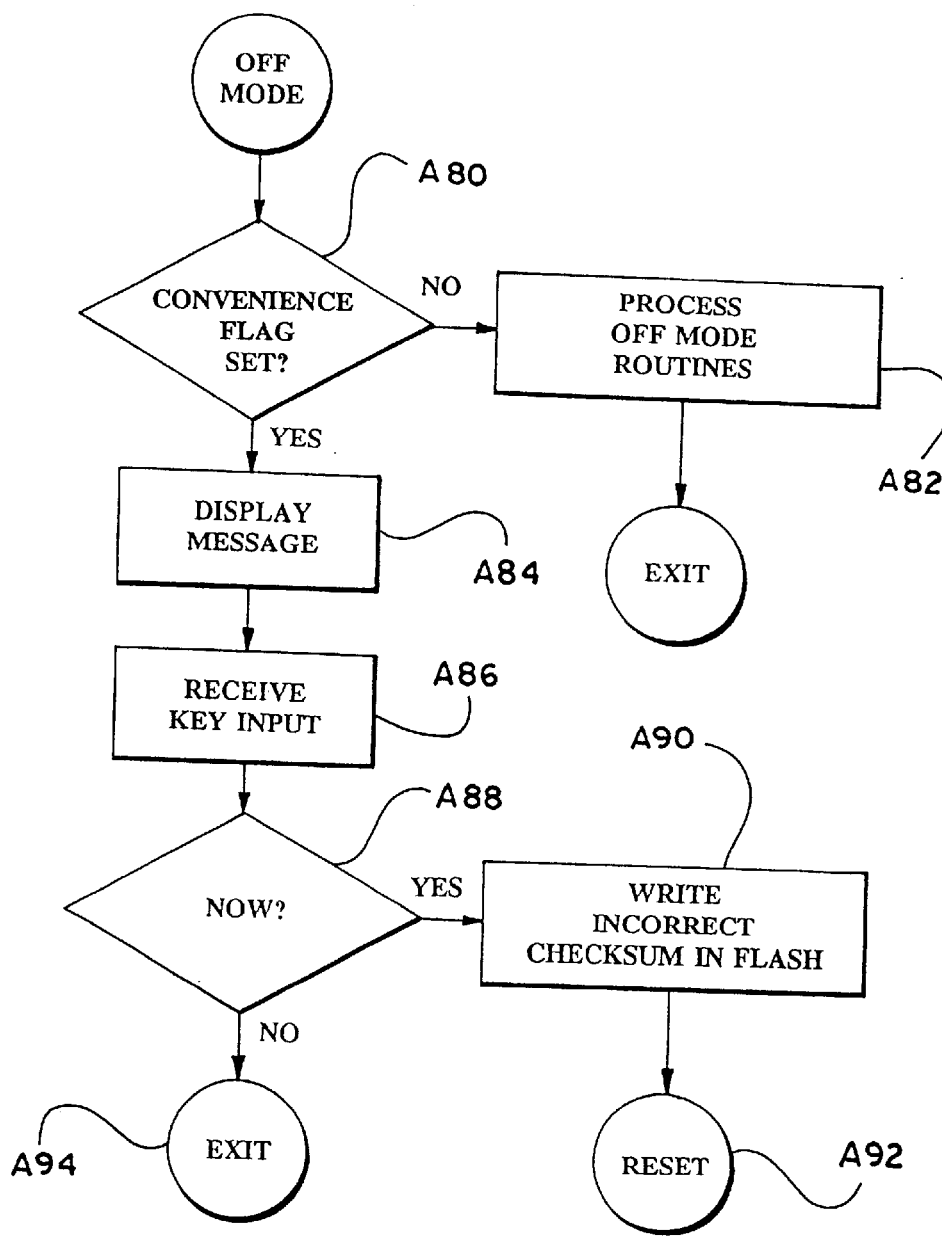
FIG. 10 is a detailed flow chart of the program code which the control microprocessor executes in the off mode of the subscriber terminal illustrated in FIG. 2.

The subscriber convenience flag is not checked until the subscriber terminal is in an off mode and then is tested with a block of program incorporated into the other off mode function routines. This block of code is more fully illustrated in FIG. 10. The program tests the consumer convenience flag in block A80 and if it is not set it processes the other off mode routines in block A82 before exiting. If the convenience flag is set, then in block A84 a message will be displayed to the subscriber indicating that "New software is available" and requesting "is it OK to update the software (this will take about __ minutes during which programming will not be available)?" Press UP for OK and DOWN for Not OK." The control microprocessor 128 will then wait for the subscriber key input in block A86, or after a tin Ieout period, will accept the lack of a key input as an affirmative response and branch to either block A90 or block A94 depending upon the response. If the subscriber does not wish the subscriber terminal to be unavailable while the program code is being downloaded, then he will select no and then the program will exit in A94. The convenience flag is thereafter tested periodically to determine whether or not the downloading can take place. If, however, the subscriber indicates that it is alright to download software, the procedure in block A90 writes an incorrect checksum in the Flash memory and resets in block A92. As discussed previously this will cause the downloading program of the boot program to activate and download the particular program code.

In one preferred embodiment shown in FIGS. 11A and 11B, the external memory and the additional security feature may be provided by the expansion card 138 which mounts additional memory modules and/or an additional secure microprocessor on a printed circuit card.

The expansion card 138 comprises a printed circuit card 300 which has a casing 350 formed of a top housing 352 and a bottom housing 354. Each housing 352, 354 is molded from plastic and can be snap fitted together over the PCB 300. The printed circuit board 300 may mount the memory components and secure microprocessor on one or both sides. The board 300 preferably has a double row (top and bottom) of finger like edge connection terminals 366. The expansion card 138 additionally has a protective door 364 which pivots about spring loaded hinges at 370. The protective door 364 protects the bottom edge terminals of the board 300 while allowing a low profile. The protective door 364, shown in its open position in FIG. 11B, pivots out of the way when the expansion card 138 is inserted into a slot 304. The spring returns the door 364 to its protective position when the card is removed. The casing 350 protects the circuit board 300 from the environment and is sturdy enough to prevent damage from most subscriber handling. The top housing 352 is provided with inclined top surfaces which meet in a peak 348 and a trough 368 to channel liquids away from the circuitry.

Figure 12A:
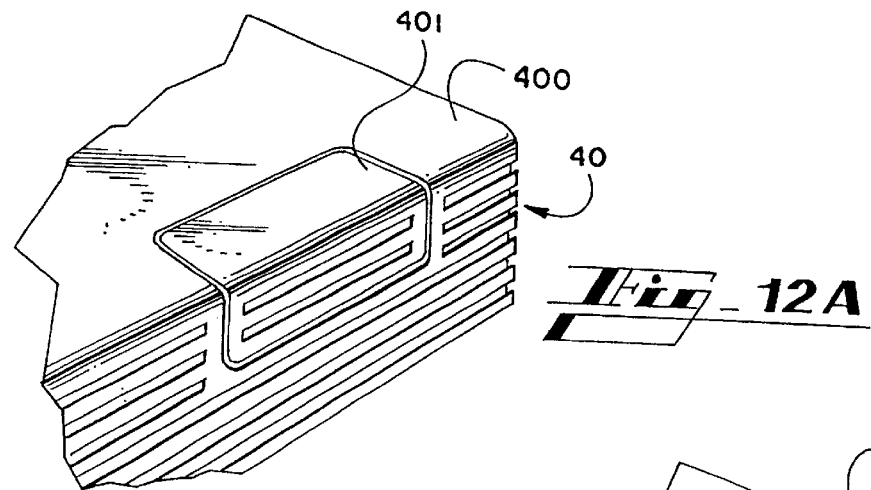
FIGS. 12A–12C are fragmented side perspective views of the subscriber terminal illustrated in FIG. 12 with a snap on cover protecting the expansion slot of the terminal, with the slot open, and the expansion card inserted in the slot.
Figure 12B:
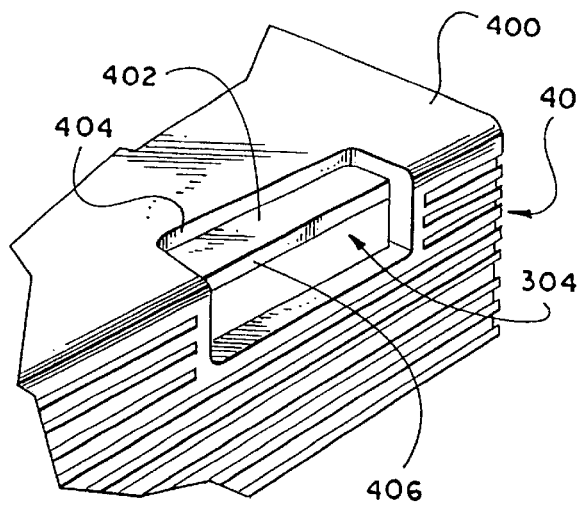

The expansion card 138 fits into connector 200 electrically coupled to the expansion connector 200. The configuration is more fully shown in FIG. 12 where a printed circuit card 300 can be plugged into a connector 302 which is electrically coupled by a ribbon cable 304 to the expansion connector 200. The expansion card 138 is mounted in the subscriber terminal 40 by inserting it through a specially designed slot 304 of the terminal cover 400. The slot, 304, as illustrated in FIGS. 12 and 12A, is generally covered by an L-shaped snap on cover 401 until the expansion card 138 is to be inserted. The slot 304 is an opening molded into the subscriber terminal casing 400 which allows access to the inside of the subscriber terminal 40 through the cover. The slot 304 has shoulder 406 which forms a step with a recess 404. Because of the secure nature of the subscriber terminal 40, it is better to provide an expansion card 138 that can be inserted into an internal connector such as 302 without having to remove the terminal cover 400. Further, the slot 304 is made as narrow as possible for security and safety concerns.

The expansion card 138 mounts in the subscriber terminal 40 by sliding it into through the slot 304 in the side of the subscriber terminal cover 400 until it mates with connector 302. The slot 304 has mounted within a carrier 410 with guides which direct the expansion card 138 toward the connector 302. As better seen in FIGS. 13A and 13B, the carrier 410 is a folded metal stamping which is attached by screws to the connector 302. The guides 412 are formed by stamping and bending parts of the carrier 410 inward to produce tabs for centering of the expansion card 138 in the slot 304. The carrier 410 further has two tangs 380 which are stamped and bent up from its body. The tangs are at positioned at an incline so they catch door 364 just before its insertion into the connector 302. As the expansion card 138 is inserted further into the slot 304, the tangs 380 force the door 364 into its open position through a cutout in 386 in the floor of carrier 410.

Figure 12C:
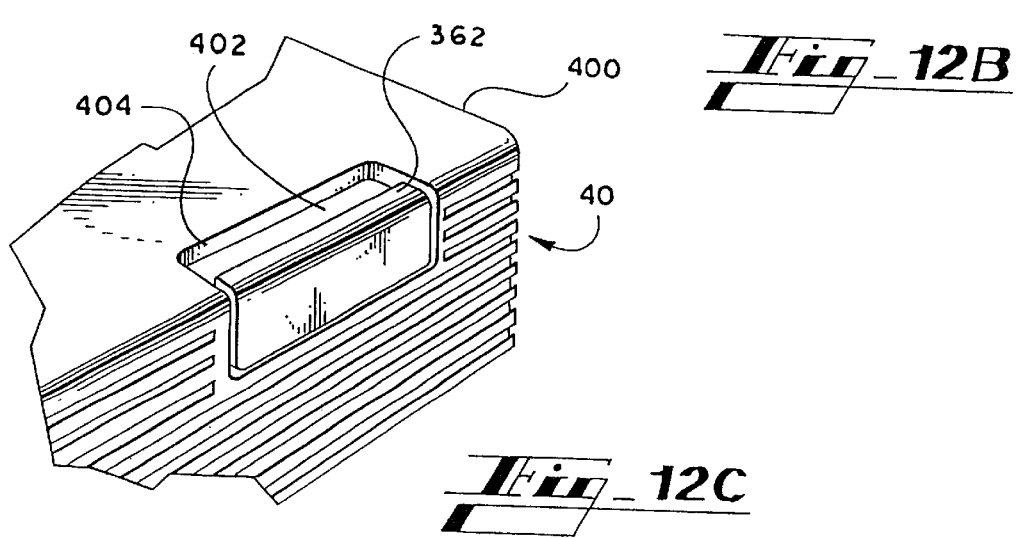

The upraised grip 362 abuts the shoulder 406 of the slot 304 when the expansion card 138 is fully inserted as in seen in FIG. 12C. The shoulder 406 acts as a stop is to prevent excessive forces being applied and while inserting the card by providing positive feedback to the subscriber to indicate that a connection has been made. The grip 362 also provides visual clues to the subscriber because it is contoured to be flush with the subscriber terminal cover 400 when the expansion card 138 is correctly inserted. The finger hold 402 on the shoulder 406 between the grip 362 and the recess 304 encourages the subscriber to correctly position his hand when taking the expansion card 138 out. By providing him a convenient finger hold 402 and grip 362, the subscriber generally pulls the card straight out and toward him instead of up which could damage the connector 302 and card 138.

While there has been shown and described the preferred embodiments of the invention, it will be evident to those skilled in the art that various modifications may be made thereto without departing from the spirit and scope of the invention as set forth in the appended claims.

What is claimed is:

1. A method comprising:

downloading computer program code to a subscriber terminal via a subscription television system, wherein the computer program code comprises at least a portion of a control program of the subscriber terminal, the control program operative for controlling predetermined features of the subscriber terminal; and storing the computer program code in memory;

providing a boot code program operative for downloading the computer program code; and activating the boot code program in response to a predetermined condition, wherein the boot code program is operative for downloading the computer program code via a selected one of a plurality of channels of the subscription television system.

2. The method of claim 1, wherein the boot code program is operative for tuning the subscriber terminal to one of the plurality of channels of the subscription television system to download the computer program code.

3. The method of claim 1, wherein the predetermined condition comprises detection of a failed memory checksum test.

4. The method of claim 1, wherein the predetermined features comprise a user interface.

5. The method of claim 1, wherein downloading the computer program code is responsive to determining that the computer program code is globally transmitted.

6. The method of claim 1, wherein downloading the computer program code is responsive to determining that the subscriber terminal is authorized to download the computer program code.

7. The method of claim 1, wherein the control program includes at least one kernel routine associated with a particular model of subscriber terminals.

8. The method of claim 7, further comprising:

storing in the memory a kernel identifier corresponding to the kernel routine;

receiving kernel revision information via the subscription television system; and comparing the kernel revision information with the stored kernel identifier.

9. The method of claim 8, wherein downloading the computer program code is responsive to determining that the kernel revision information corresponds to the kernel identifier.

10. The method of claim 8, wherein the kernel revision information is provided in a download parameters transaction provided via the subscription television system.

11. The method of claim 1, further comprising:

storing in the memory a code identifier corresponding to a version of the control program;

receiving code revision information via the subscription television system; and comparing the code revision information with the stored code identifier.

12. The method of claim 11, wherein downloading the computer program code is responsive to determining that the code revision information corresponds to the stored code identifier.

13. The method of claim 11, wherein the code revision information is provided in a download parameters transaction provided via the subscription television system.

14. The method of claim 1, wherein downloading the computer program code is responsive to receiving a download immediately command.

15. The method of claim 14, wherein the download immediately command is indicated by a state of a flag provided in a download parameters transaction.

16. The method of claim 15, wherein a first state of the flag indicates that the computer program code should be downloaded immediately, and a second state of the flag indicates that the computer program code should be downloaded at a later time.

17. The method of claim 1, further comprising:

providing a flag in the subscriber terminal indicating that the subscriber terminal is not to be interrupted with a download operation; and responsive to the flag being in a first state, displaying a message on a display device associated with the subscriber terminal indicating that computer program code is available for downloading;

wherein downloading the computer program code is responsive to receiving user input authorizing the downloading.

18. A subscriber terminal comprising:

a processor that is programmed to initiate downloading of computer program code via a subscription television system, wherein the computer program code comprises at least a portion of a control program of the subscriber terminal, the control program operative for controlling predetermined features of the subscriber terminal, wherein the processor is programmed to initiate downloading of the computer program code responsive to instructions contained in a boot code program, wherein the boot code program is operative for downloading the computer program code via a selected one of a plurality of channels of the subscription television system; and memory for storing the downloaded computer program code.

19. The subscriber terminal of claim 18, wherein the boot code program is operative for tuning the subscriber terminal to one of the plurality of channels of the subscription television system to download the computer program code.

20. The subscriber terminal of claim 18, wherein the boot code program is executed by the processor responsive to a failed memory checksum test.

21. The subscriber terminal of claim 18, wherein the predetermined features comprise a user interface.

22. The subscriber terminal of claim 18, wherein the processor is programmed to initiate downloading of the computer program code responsive to determining that the computer program code is globally transmitted.

23. The subscriber terminal of claim 18, wherein the processor is programmed to initiate downloading of the computer program code responsive to determining that the subscriber terminal is authorized to download the computer program code.

24. The subscriber terminal of claim 18, wherein the control program includes at least one kernel routine associated with a particular model of subscriber terminals.

25. The subscriber terminal of claim 24, further comprising:

a kernel identifier corresponding to the kernel routine, the kernel identifier being stored in the memory.

26. The subscriber terminal of claim 25, wherein the processor is programmed to initiate downloading of the computer program code responsive to determining that kernel revision information received via the subscription television system corresponds to the kernel identifier.

27. The subscriber terminal of claim 25, wherein the kernel revision information is provided in a download parameters transaction provided via the subscription television system.

28. The subscriber terminal of claim 18, further comprising:
a code identifier corresponding to a version of the control program, the code identifier being stored in the memory.

29. The subscriber terminal of claim 28, wherein the processor is programmed to initiate downloading of the computer program code responsive to determining that code revision information received via the subscription television system corresponds to the code identifier.

30. The subscriber terminal of claim 28, wherein the code revision information is provided in a download parameters transaction provided via the subscription television system.

31. The subscriber terminal of claim 28, wherein the processor is programmed to initiate downloading of the computer program code responsive to the subscriber terminal receiving a download immediately command.

32. The subscriber terminal of claim 31, wherein the download immediately command is indicated by a state of a flag provided in a download parameters transaction.

33. The subscriber terminal of claim 32, wherein a first state of the flag indicates that the computer program code is to be downloaded immediately, and a second state of the flag indicates that the computer program code is to be downloaded at a later time.

34. The subscriber terminal of claim 18, further comprising: a flag stored in the memory indicating that the subscriber terminal is not to be interrupted with a download operation.

35. The subscriber terminal of claim 34, wherein the processor is programmed to cause a message to be displayed on a display device responsive to the flag being in a first state, the message indicating that the computer program code is available for downloading.

36. A method comprising:
storing in a memory of a subscriber terminal a kernel identifier corresponding to a kernel routine;
receiving kernel revision information via a subscription television system;
comparing the kernel revision information with the stored kernel identifier;
storing in the memory a code identifier corresponding to a version of a control program;
receiving code revision information via the subscription television system;
comparing the code revision information with the stored code identifier;
providing a flag in the memory indicating whether the subscriber terminal is authorized to be interrupted with a download operation;
downloading computer program code to the subscriber terminal via the subscription television system responsive to:
the kernel revision information corresponding to the stored kernel identifier,
the code revision information corresponding to the stored code identifier, and
the flag indicating that the subscriber terminal is authorized to be interrupted with a download operation; and
storing the computer program code in the memory.

* * * * *